United States Patent
Bhaskaran (10) Patent No.: US 6,714,993 B1
(45) Date of Patent: Mar. 30, 2004

(54) PROGRAMMABLE MEMORY BASED CONTROL FOR GENERATING OPTIMAL TIMING TO ACCESS SERIAL FLASH DEVICES

(75) Inventor: Suraj Bhaskaran, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/577,402

(22) Filed: May 22, 2000

(51) Int. Cl.[7] ............................................. G06F 3/00
(52) U.S. Cl. ..................... 710/2; 710/5; 710/7; 710/36; 711/167
(58) Field of Search ............................. 710/2, 5–8, 13, 710/20, 23, 25, 36; 711/115, 167

(56) References Cited

U.S. PATENT DOCUMENTS

| | | | | |
|---|---|---|---|---|
| 4,468,729 A | * | 8/1984 | Schwartz | 711/172 |
| 5,202,999 A | * | 4/1993 | Lenthall et al. | 710/244 |
| 5,634,112 A | | 5/1997 | Thome et al. | 395/481 |
| 5,752,267 A | * | 5/1998 | Moyer et al. | 711/167 |
| 5,809,517 A | | 9/1998 | Shimura | 711/115 |
| 5,813,038 A | | 9/1998 | Thome et al. | 711/154 |
| 5,920,884 A | | 7/1999 | Jennings, III et al. | 711/102 |
| 5,920,898 A | | 7/1999 | Bolyn et al. | 711/167 |
| 5,951,685 A | | 9/1999 | Stancil | 713/2 |
| 5,978,860 A | * | 11/1999 | Chan et al. | 710/8 |
| 5,983,330 A | | 11/1999 | Miwa et al. | 711/167 |
| 6,338,137 B1 | * | 1/2002 | Shiell et al. | 712/225 |
| 6,397,272 B1 | * | 5/2002 | Horiguchi | 710/48 |

* cited by examiner

Primary Examiner—Jeffrey Gaffin
Assistant Examiner—Eron Sorrell
(74) Attorney, Agent, or Firm—Williams, Morgan & Amerson (57) ABSTRACT

In its many aspects and variations, a method for accessing a peripheral memory from a processor is provided. The method comprises first initiating the access. Information is then written from the processor to an operational register in a processor memory to enable the peripheral memory. The processor then processes parallel instructions for a predetermined time during which the access occurs. When the access is over, the processor reads the operational register to disable the peripheral memory. In other aspects, an apparatus programmed to perform this method and a program storage medium encoded with instructions that, when executed by a computer, perform the method are provided.

35 Claims, 7 Drawing Sheets

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| X | NCS1 | NCS0 | X | PMBCMOD | X | ALE | CLE | X | X | X | X | X | X | X | X |

PROGRAMMABLE MEMORY BASED CONTROL FOR GENERATING OPTIMAL TIMING TO ACCESS SERIAL FLASH DEVICES

BACKGROUND OF THE INVENTION

1. Field of the Invention

This invention relates to external memory interfaces, and more particularly to a method and apparatus for efficiently interfacing a peripheral memory, such as a slow flash device, with a processor, such as a fast digital signal processor.

2. Description of the Related Art

The ever increasing clock speeds of microprocessors have garnered much attention lately. Generally speaking, faster microprocessors mean faster, more powerful personal computers. The same is true for any electronic or computing device that relies on any of the several types of processors. These "other" types of processors include, for instance, digital signal processors ("DSPs") and micro-controllers. Just as microprocessors have steadily increased in power and speed, so have other types of processors. The power and speed of all manner of electronic and computing equipment consequently continues to increase dramatically.

However, processor clock speed is not the only, or even the determining factor in power and efficiency of a system as a whole. Performance of even the fastest, most powerful processor can be radically affected by other system design features. For instance, processors must communicate with other system components over "buses." The amount of information that may be transmitted over a bus in a given time period is its "bandwidth," a characteristic generally independent of the processor's clock speed. Thus, a fast processor's performance may be limited by a slow bus, since the bus can only transmit a limited amount of data no matter how fast the processor can actually communicate it to or from the bus.

Performance may also be compromised by interfacing a fast processor with a slow peripheral device. Processors typically interact with the outside world through peripheral devices. For instance, a processor in a personal computer may receive input from a user through a keyboard or a mouse, display information over a monitor, or output information to a printer. The keyboard, mouse, monitor, and printer are all "peripheral" devices. The processor's performance may be degraded in this circumstance by a number of factors, including slow response time by the peripheral or complicated protocols that must be followed to ensure an accurate transmission between the processor and the peripheral.

In fact, utilization of peripheral devices is a common inhibitor of processor performance and can frequently be traced to slow response. The typical approach employed by most processors in this circumstance is to initiate the access (i.e., a read from or a write to) and then wait for the peripheral device to become ready for the access. More technically, the processor enters a "wait state," in which its operations typically cease until the peripheral device is ready. These wait states invariably are longer than it takes the processor to execute most instructions, or even a series of instructions. Thus, precious instruction cycles in which the processor might be performing useful tasks are wasted waiting on the peripheral device. It takes only a few accesses to a peripheral device in these circumstance to degrade the performance of a system including a fast, powerful processor.

One attempt to meet some of these challenges is called "system on a chip", or "SOC." This approach tries to combine a variety of functions typically found in separate parts of a computing system onto a single chip. Several drawbacks associated with buses and access time can be mitigated. However, it has exacerbated at least one problem: the object of most SOC integrated circuit ("IC") designs is to create a general purpose programmable system that leaves future modifications and enhancements to firm-ware modification alone to enhance the life cycle of the IC. Due to ever-changing timing specifications of external peripherals, this is hard to accomplish. Modifications or enhancements to the IC other than software modifications are difficult or expensive to implement. This becomes more significant over the life of the IC as peripheral devices evolve to employ new or otherwise different protocols.

The present invention is directed to resolving one or all of the problems mentioned above.

SUMMARY OF THE INVENTION

The invention, in its many aspects and variations, includes a method for accessing a peripheral memory from a processor. The method comprises first initiating the access. Information is then written from the processor to an operational register in a processor memory to enable the peripheral memory. The processor then processes parallel instructions for a predetermined time during which the access occurs. When the access is over, the processor reads the operational register to disable the peripheral memory. In other aspects, the invention includes an apparatus programmed to perform this method and a program storage medium encoded with instructions that, when executed by a computer, perform the method.

BRIEF DESCRIPTION OF THE DRAWINGS

The invention may be understood by reference to the following description taken in conjunction with the accompanying drawings, in which like reference numerals identify like elements, and in which:

FIGS. 4A–4B detail selected portions of the apparatus in FIG. 3, and more particularly:

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
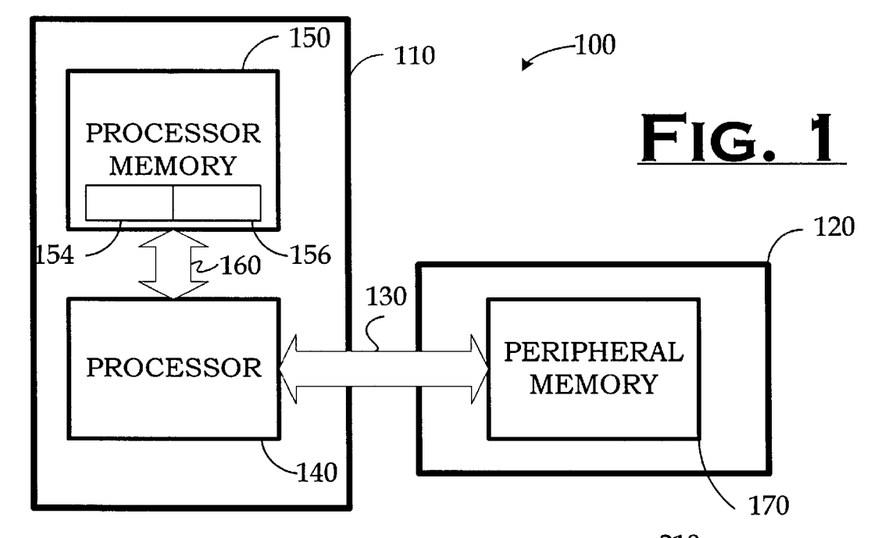
FIG. 1 depicts an apparatus constructed and operated in accordance with the present invention in a conceptualized, block diagram.

FIG. 1 depicts an apparatus 100 constructed and operated in accordance with the present invention in a conceptualized, block diagram. The apparatus 100 includes a computer 110 interfaced with a peripheral device 120 over a data and control bus 130. The computer 110 includes a processor 140 and a processor memory 150. The processor memory includes an "operational" register 154 and a storage area 156. The processor 140 is electrically connected to the processor memory 150 over a second bus 160. The peripheral device 120 includes a peripheral memory 170 electrically connected to the processor 140 over the bus 130. The apparatus 100 may be implemented in many ways within the scope of the invention as claimed below.

For instance, the processor 140 may be any kind of processor, such as a microprocessor, such as the Athlon™ microprocessor; a SOC with a digital signal processor ("DSP"), such as the AM79C493/AM79C493A; or a microcontroller, such as the 80C51. The Athlon™ microprocessor, AM79C493/AM79C493A, and 80C51 are all readily commercially available from Advanced Micro Devices Corporation, the assignee of this invention, who may be contacted at:

One AMD Place
P.O. Box 3453
Sunnyvale, California 94088-3453
(408) 732-2400
(800) 538-8450
TWX:910-339-9280
TELEX:34-6306
<www.amd.com>

In one particular embodiment, the computer 110 is a "system on a chip" in which the processor 140 is an embedded DSP. One implementation of this particular embodiment is discussed further below. Furthermore, the processor 140 may operate on any kind of operating system including, but not limited to, a disk operating system ("DOS"), a MacIntosh ("Mac"), a Windows®, or a UNIX operating system, such as LINUX.

The buses 130, 160 may operate in accordance with any suitable protocol known to the art and, in some embodiments, may comprise separate data and control buses. As will be appreciated by those skilled in the art having the benefit of this disclosure, the bus 130 is an "external" or expansion bus and the bus 160 is an internal bus. Hence, the buses 130, 160 will typically, but not necessarily, be implemented using different protocols. Exemplary bus protocols for one or the other include, but are not limited to, the following:

a Future I/O bus;
a Next Generation I/O ("NGIO") bus;
an Accelerated Graphics Port ("AGP") bus;
an Apple Desktop Bus ("ADB");
an Access.bus;
a CardBus;
a Compact Peripheral Component Interface ("CompactPCI") bus;
an Enhanced Intelligence Drive Electronics ("EIDE") bus;
an Extended Industry Standard Architecture ("EISA") bus;
a Fibre Channel;
an IEEE-1394 (e.g., Firewire®) bus;
an Industry Standard Architecture ("ISA") bus;
an Intelligence Drive Electronics ("IDE") bus;
an Inter-IC ("I2C") bus;
a Micro Channel Architecture ("MCA") bus;
a NuBus;
a Peripheral Component Interconnect ("PCI") bus;
a PCI-X bus;
a Personal Computer Memory Card International Association ("PCMCIA") bus;
a Small Computer System Interface ("SCSI") bus;
a Universal Serial Bus ("USB");
a VersaModule Eurocard ("VME") bus;
a Video Electronics Standards Association ("VESA") bus; and
a Video Electronics Standards Association local bus ("VL-Bus").

Still other standards and/or protocols might be employed.

The processor memory 150 may include a wide variety of memory types depending is on the particular implementation. The memory types might include cache, random access memory ("RAM"), and read only memory ("ROM") in addition to the operational register 154 shown. The RAM may be static ("SRAM") or dynamic ("DRAM"), volatile or non-volatile, interleaved or non-interleaved, or any combination of the same. More particularly, the various types of memory technology that might be employed include, but are not limited to:

ferroelectric random access memory (or "FRAM," which is a trademark of Ramtron International Corporation), which combines the access speed of DRAM and SRAM with the non-volitility of ROM;
programmable ROM ("PROM"), including erasable PROM ("PROM") and/or electrically erasable PROM ("EEPROM");
video RAM ("VRAM");
windows RAM ("WRAM");
Synchronous DRAM ("SDRAM");
Rambus DRAM ("RDRAM");
SyncLink DRAM ("SLDRAM");
extended data output DRAM ("EDO DRAM"), including burst EDO DRAM ("BEDO DRAM");
fast page mode RAM ("FPRAM"), a type of DRAM;
multi-bank DRAM ("MDRAM");
parameter RAM ("PRAM");

double data rate SDRAM ("DDR SDRAM");
a synchronous graphic RAM ("SGRAM"); and
cache, either as memory caching or disk caching implementations Still other types of memory technologies might be employed. The processor memory 150 will include cache, RAM, and ROM in most implementations.

Thus, some or all of the processor memory 150 may be "on-chip" in the sense that, for instance, a microprocessor may have cache "on-chip." In the embodiment where the computer 100 comprises a "system on a chip," all of the processor memory 150 will be on-chip. In alternative embodiments, however, some of the processor memory 150 might be "off chip" in the sense that, for instance, a microprocessor in a desktop personal computer has RAM offchip.

As noted above, the processor memory 150 includes the operational register 154. Virtually all processors employ a type of memory known as a "register." A register is a high speed storage element used to temporarily store information. When the information necessary to execute an instruction is stored in a register, or several registers, the instruction can be executed more rapidly than if the information were stored in other kinds of storage. Many processors have not only a number of registers, but include several types of registers for special purposes. The operational register 154 is used to access the peripheral memory 150 in read and write operations as described more fully below.

The processor memory 150 may be implemented using any suitable storage medium known to the art. For instance, the processor memory may be implemented using a medium such as optical, such as a compact disk ("CD") ROM, or magnetic, such as a floppy or hard disk, in nature. Typically, the processor memory 150 will be implemented using both optical and magnetic storage media. The invention is not limited by the nature of the medium.

The peripheral device 120 may also be one of many types of peripheral devices. A "peripheral" device may be any external device interfaced with a computer, e.g., external disk drives, keyboards, printers, mice, external modems, etc. The peripheral memory 170 may be any one of several memory types and, in one embodiment, is a flash memory. However, other memory types, such as FRAM, might be employed depending on the particular implementation.

Figure 2:
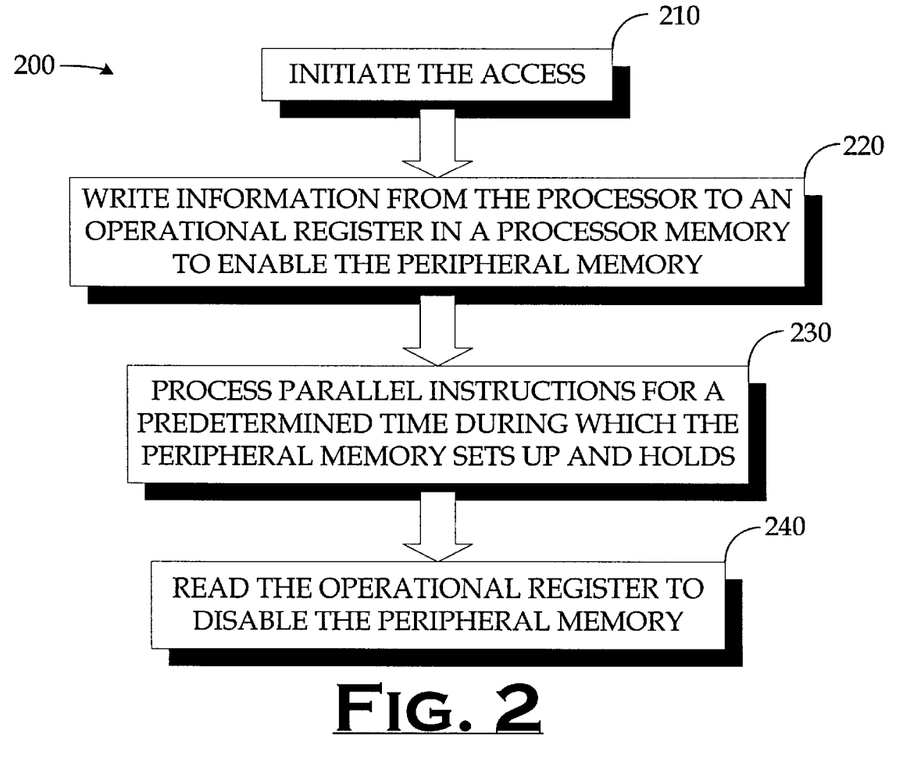
FIG. 2 illustrates a method performed in accordance with the present invention and that may be implemented on the apparatus of FIG. 1.

Turning now to FIG. 2, a method 200 for accessing a peripheral memory, e.g., the peripheral memory 170, from a processor, e.g., the processor 140, is illustrated. The method 200 will be discussed in the context of the apparatus 100 in FIG. 1, but the invention is not so limited. Note that the method 200 is implemented in a software driver for the peripheral device 120 that may be stored in the processor memory 150. The processor 140 is aware of the software driver as it is loaded by the processor 140 as part of the basic input/output system ("BIOS") during power-on or reset. The BIOS may also be stored in the processor memory 150, and typically be stored in some kind of read only or flash memory. Thus, in its various aspects, the invention includes, among other things, a method implemented in a is software driver, a program storage medium encoded with instructions that constitute the software driver, and a computer programmed with the software driver.

The method 200 begins, as set forth in the box 210, by initiating the access. The access may be either a write to or a read from the peripheral memory 170 over the bus 130. The access is initiated by the processor 140 in accordance with its programming, and will be to some degree implementation specific. For instance, certain devices might need to be enabled, or the processor 140 might need to arbitrate for ownership of portions of the bus 130. The processor 140 might also need to set the contents of control registers governing the access. Two more specific examples are set forth below in connection with one particular implementation depicted in FIGS. 3–5. As used in this context, to "initiate" the access means for the processor 140 to take the steps necessary for the access to occur.

The method 200 then proceeds by writing information from the processor 140 to the operational register 154 in the processor memory 150 to enable the access, as set forth in box 220. If the access is a write operation, then the information written to the operational register 154 may be the actual information to be written to the peripheral memory 170. If the access is a read operation, then the value of the information is immaterial, and the written information may be dummy information. The write to the operational register 154 generates the signals necessary for the access to occur, including read and/or write enables and read and/or write strobes for and to the peripheral memory 170.

The method 200 next calls for the processor 140 to process parallel instructions for a predetermined time during which the access occurs, as set forth in the box 230. The predetermined time will be known from the identity of the peripheral device 120 and will be stored in the software driver that the processor 140 employs to access the peripheral memory 170. This predetermined time should include not only the time necessary for the actual data transfer to occur, but also the setup and hold times. If the access is a read, the peripheral device 120 writes data from the peripheral memory 170 to the operational register 154. If the access is a write, the peripheral device 120 reads data from the operational register 154 to the peripheral memory. In some embodiments, an extra delay may be introduced into the predetermined time to account for particularly slow peripherals or to provide additional margin.

The method 200 concludes by reading the operational register 154 to disable the access, as set forth in the box 240. The read to the operational register 154 generates all signals necessary for disabling the transfer, including the release of any read and write enables and/or strobes. If the operation is a read, reading the operational value will yield real information. If the operation is a write, then the value of the information is immaterial and will yield dummy information. Once the method 200 concludes, the processor 140 may resume processing other instructions, including a new access.

Thus, the present invention addresses the issue of accessing a slow peripheral such as a serial flash device from a fast processor. To avoid the problems inherent in the conventional approach, the present invention employs a software controlled timing generation scheme. The software driver runs on the processor and can program the setup time, hold time, and access time given to the slow peripheral, while simultaneously utilizing its instruction cycles for other tasks instead of having to wait for the slow peripheral device to respond. The processor can continue with other tasks that it needs to complete, and then come back and finish the access that it started at the opportune time when the programmer knows the peripheral would have responded.

Note that some portions of the detailed description above are presented in terms of symbolic representations of operations on data bits within a computer memory. This type of description is the technique by which those skilled in the art most effectively convey the substance of their work to others in the art. However, the techniques actually describe the physical manipulation of physical quantities. Usually, though not necessarily, these quantities are electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Unless specifically stated otherwise as apparent from the following discussions, it is appreciated that throughout the present invention, discussions utilizing terms such as "processing," "computing," "calculating," "determining," "accessing," "displaying," or the like, refer to the action and processes of a computer system, or similar electronic computing device. These actions and processes manipulate and transform data represented as physical (electronic) quantities within the computer system's registers and memories into other data similarly represented as physical quantities within the computer system memories or registers or other such information storage, transmission or display devices.

FIGS. 3–4, 5A–5B, and 6A–6B illustrate one particular implementation 300 of the apparatus 100 in FIG. 1 implementing the method 200 of FIG. 2. The implementation 300 includes an electronic computing device 310, housing a processor 340 communicating with a processor memory 350 over a bus 160. The processor 340 communicates with a peripheral memory 370 in a peripheral 320 over a bus 130. The buses 130, 160 are as described above with respect to the embodiment 100 of the apparatus in FIG. 1. The peripheral memory 370, the processor 340, and the processor memory 350 are discussed further below.

Figure 3:
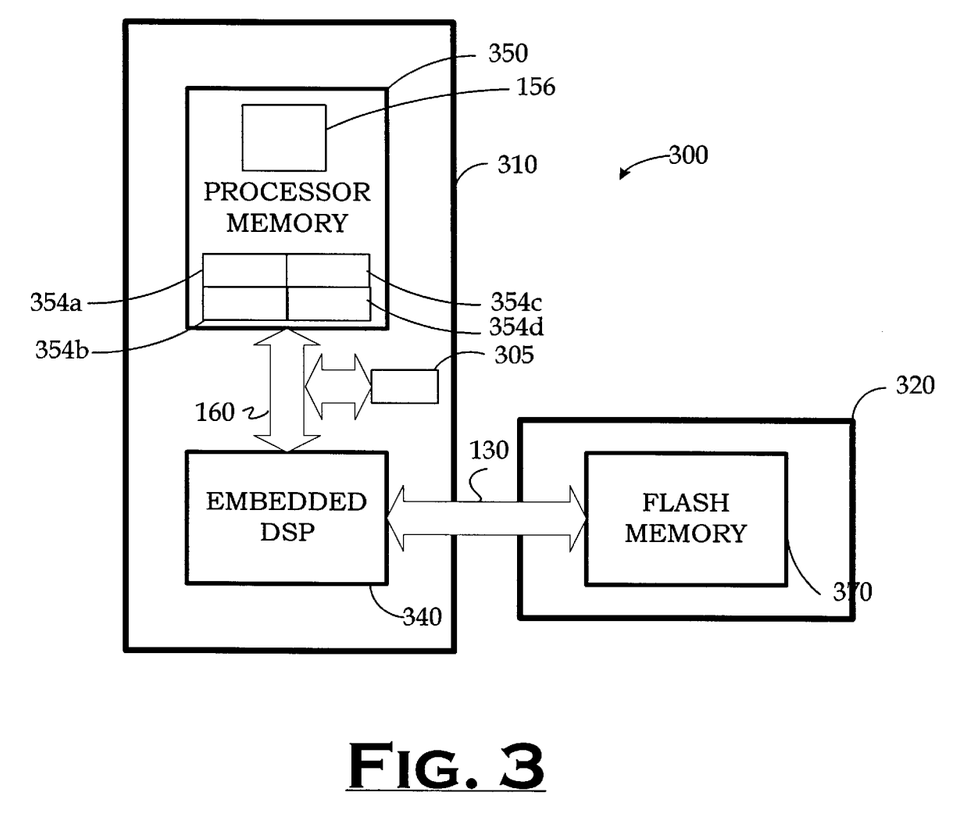
FIG. 3 depicts one implementation of the apparatus in FIG. 1.

In this particular embodiment, the peripheral memory 370 is a flash memory. A flash memory is a memory that can be erased and reprogrammed in blocks instead of one byte at a time. Flash memories are typically implemented in one or more electrically erasable, programmable, read only memories ("EEPROMs"). Flash memories are common in peripheral equipment designs because they allow peripheral manufacturers to support new protocols as they become standardized. Note, however, that the peripheral memory might also be implemented in FRAM or some other type of memory as discussed above.

The processor 340 is an embedded DSP, such as in the AM79C493/AM79C493A commercially available from Advanced Micro Devices. This particular implementation 300 utilizes the existing data memory access of a given processor, which is part of the architecture of that processor. A translation circuit 305, discussed more fully below, translates the access of the processor 340 from the hardwired approach found in conventional practice to the programmable memory based access approach of the present invention. This allows the processor 340 to run at its full capacity without having to use wait-states to interface with any external slow memory device, e.g., the flash memory 370.

This particular implementation utilizes three basic registers located in the processor memory 350:
- a flash memory control register 354a, located at data memory address 0x3e01;
- a flash write register 354b, located at data memory address 0x3e14; and
- a flash read register 354c, at data memory address 0x3e15.

The flash write and flash read registers 354b, 354c are used to write and read data from the flash memory 370 along with the flash memory page register 354d, which generates pertinent control signals. Thus, in this particular embodiment, the function of the operational register 154 in FIG. 1 is separated into dedicated flash write and flash read registers 354b, 354c.

Figure 4A:
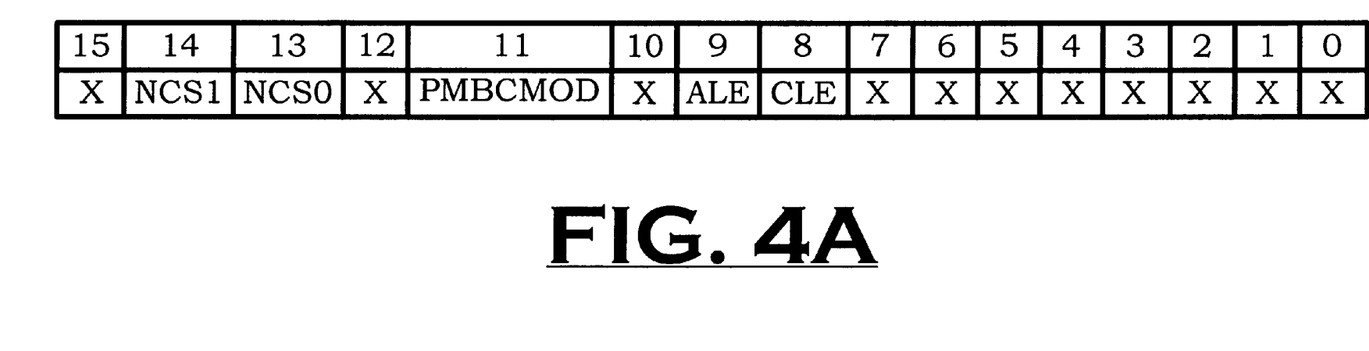
FIG. 4A is a register definition for implementing control signals to the external flash.

The content of the flash memory control register 354a is shown in FIG. 4A and is defined in Table 1. The chip selects (e.g., NCS1, NCS0, etc.) and controls signals (e.g., ALE and CLE) are wired directly to the pins (not shown) of the processor 340. These bits are essentially programmable flags for the processor 340. Consequently, setting these bits in the flash memory control register will deliver the set values on the corresponding wires of the bus 130 as output signals.

TABLE 1

Definition of Flash Memory Control Register Contents

| | |
|---|---|
| NCS1 | Sample Flash Chip Select. Writing 1 to this bit pulls the /CS1 pin of chip low (active), whereas writing 0 to it pulls the /CS1 pin high (inactive). |
| NCS0 | Another Flash Chip Select as may be required. Writing 1 to this bit pulls the /CS0 pin of chip low (active), whereas writing 0 to it pulls the /CS0 pin high (inactive). |
| PMBC-MOD | Programmable Memory Based Control Mode. Writing 1 to this bit enables the programmable memory mode. Clearing this bit causes the external memory accesses of the processor to revert back to its default. |
| ALE | Flash Address Latch Enable. Writing 1 to this bit pulls the ALE pin of the chip high, whereas writing 0 to it pulls the ALE pin low. |
| CLE | Flash Command Latch Enable. Writing 1 to this bit pulls the CLE pin of the chip high, whereas writing 0 to it pulls the CLE pin low. |
| X | Immaterial. |

Figure 4B:
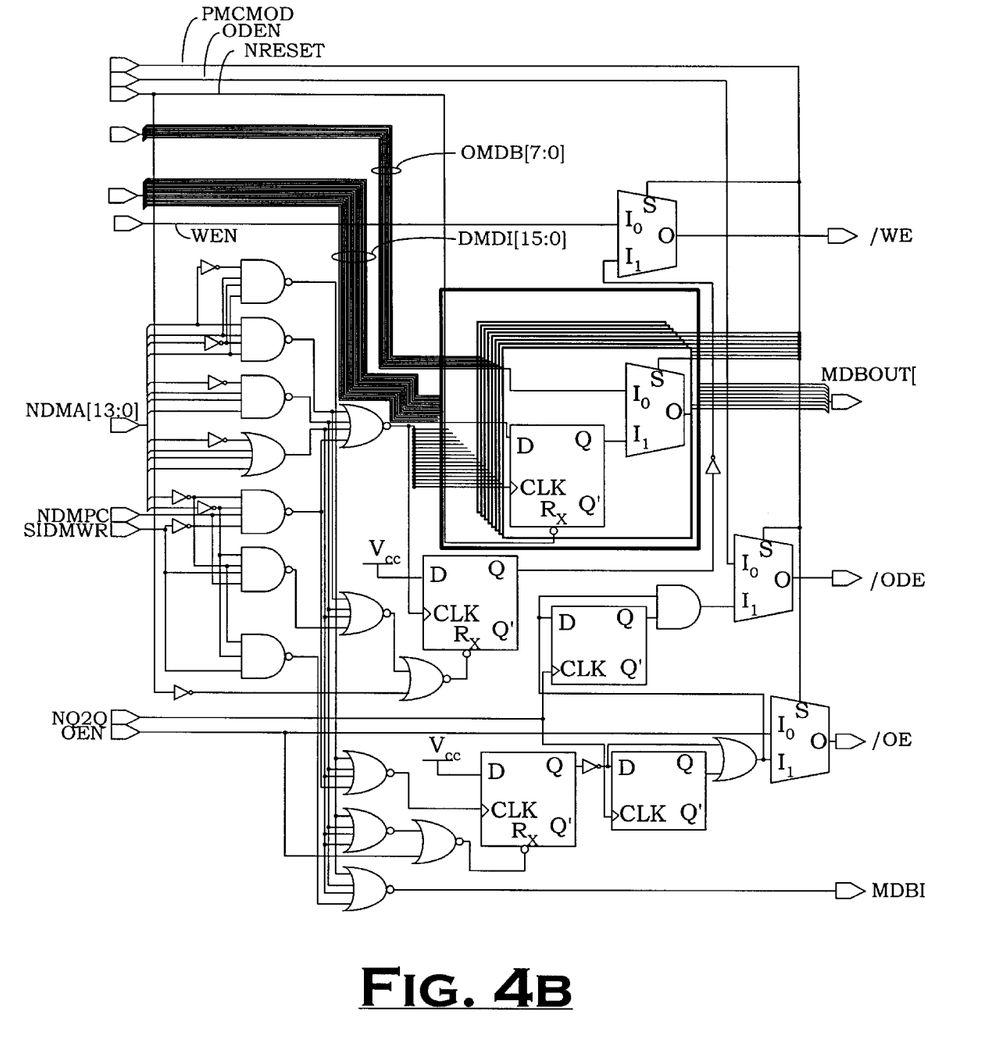
FIG. 4B is a schematic circuit diagram of the programmable memory based control that drives data to and from the external memory device.
Figure 5:
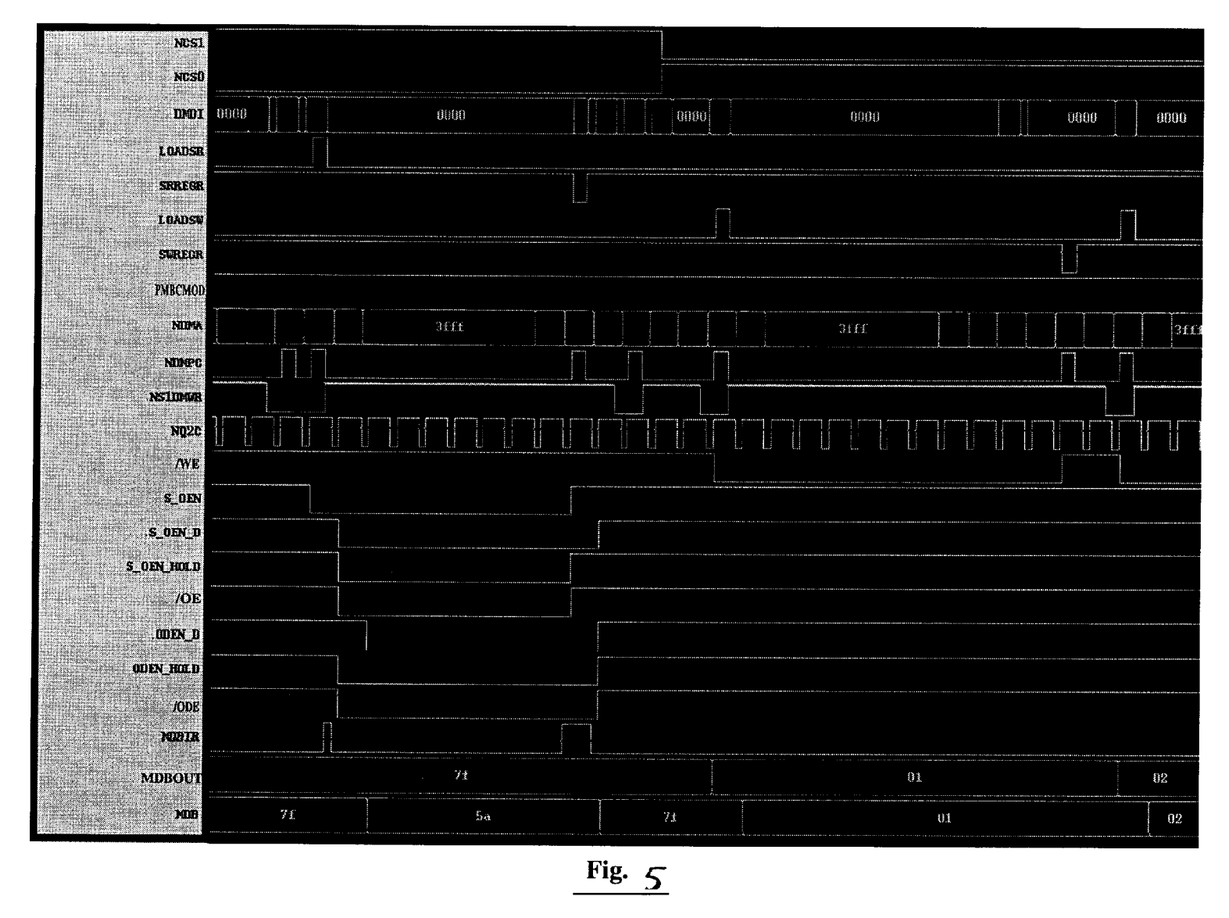
FIG. 5 depicts selected timing diagrams illustrating the operation of the circuit of FIG. 4B.

FIG. 4B details the translation circuit 305 in FIG. 3. FIG. 5 presents timing diagrams illustrating the timing of various signals in this implementation for accesses generated by the processor 340 to the peripheral memory 370 in read and write operations. The signals presented in the waveforms in FIG. 5 help visualize the working of the logic presented in FIG. 4B.

More particularly, FIG. 4B shows the logic used to implement the flash read/write registers, which help in the latching of the data to be written to the flash memory 370 and the creation of the read (/OE) and write (/WE) strobes for the flash interface. It also shows the logic used to create the tri-state control for the MBD bidirectional data-bus at the pads.

PMBCMOD is used to switch the /WE, /OE, /ODE (MDB tri-state control), and the MDBOUT[7:0] bus from the dsp's write enable (WEN), read enable (OEN), MDB bus tri-state control (ODEN), and dsp's data output bus OMDB[7:0]. The dsp 340 accesses the flash read/write registers by writing the address to the NDMA[13:0] bus, and sends data access cycle and read/write information through NDMPC and NS1DMWR. In this logic, NQ2C (which is one of the 4-phase clocks of the dsp in this example) is utilized to move some edges to the next phase, which has no pertinence to this discussion. MDBDIR is another signal used to mux the read data from the flash read/write registers on to the dsp bus 130, and again has no significance in this disclosure. The workings of this sample implementation give a general idea of the scope of this invention disclosure.

Figure 6A:
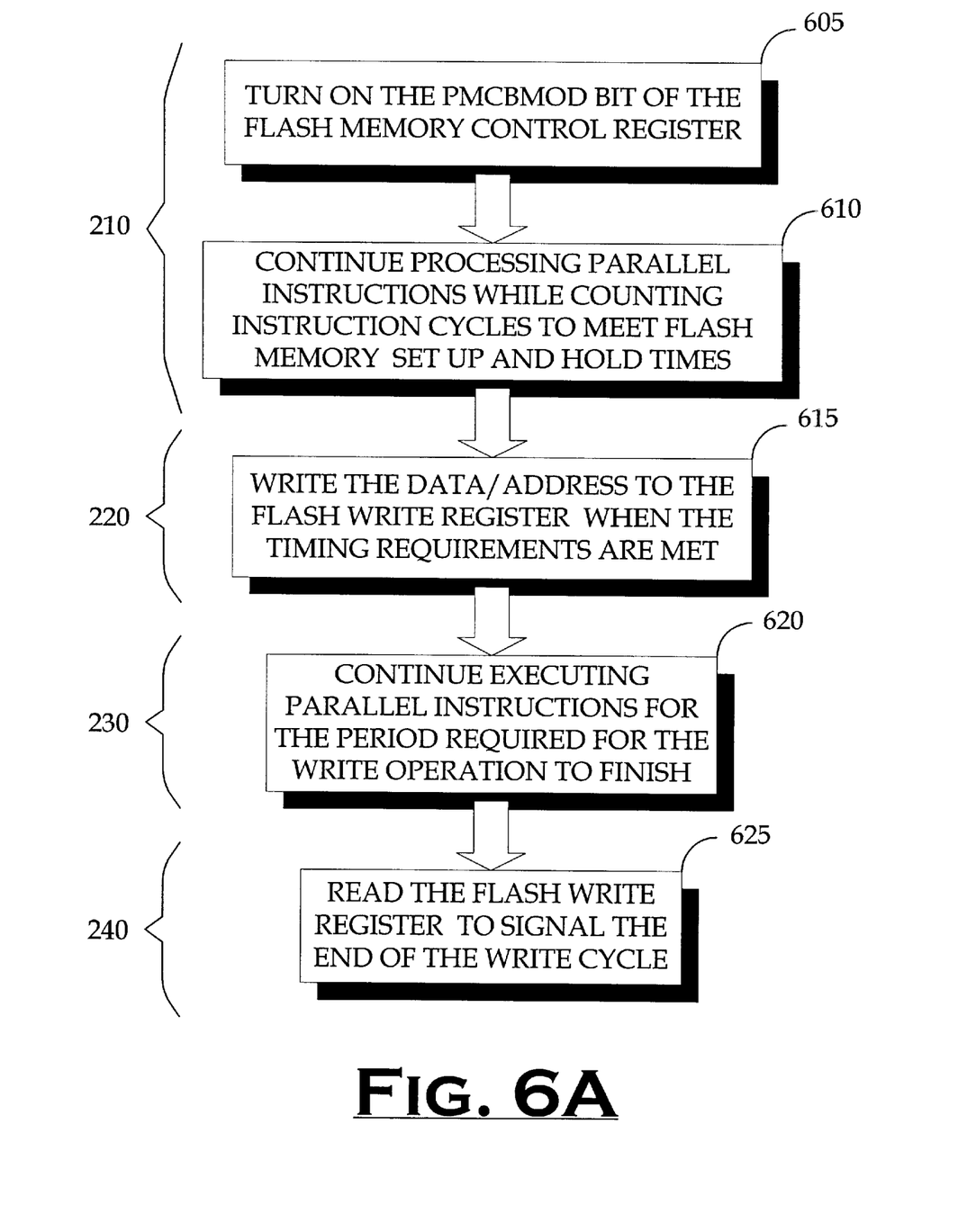
FIGS. 6A–6B illustrate one particular implementation of the method in FIG. 2 implemented with the apparatus in FIG. 3.
Figure 6B:
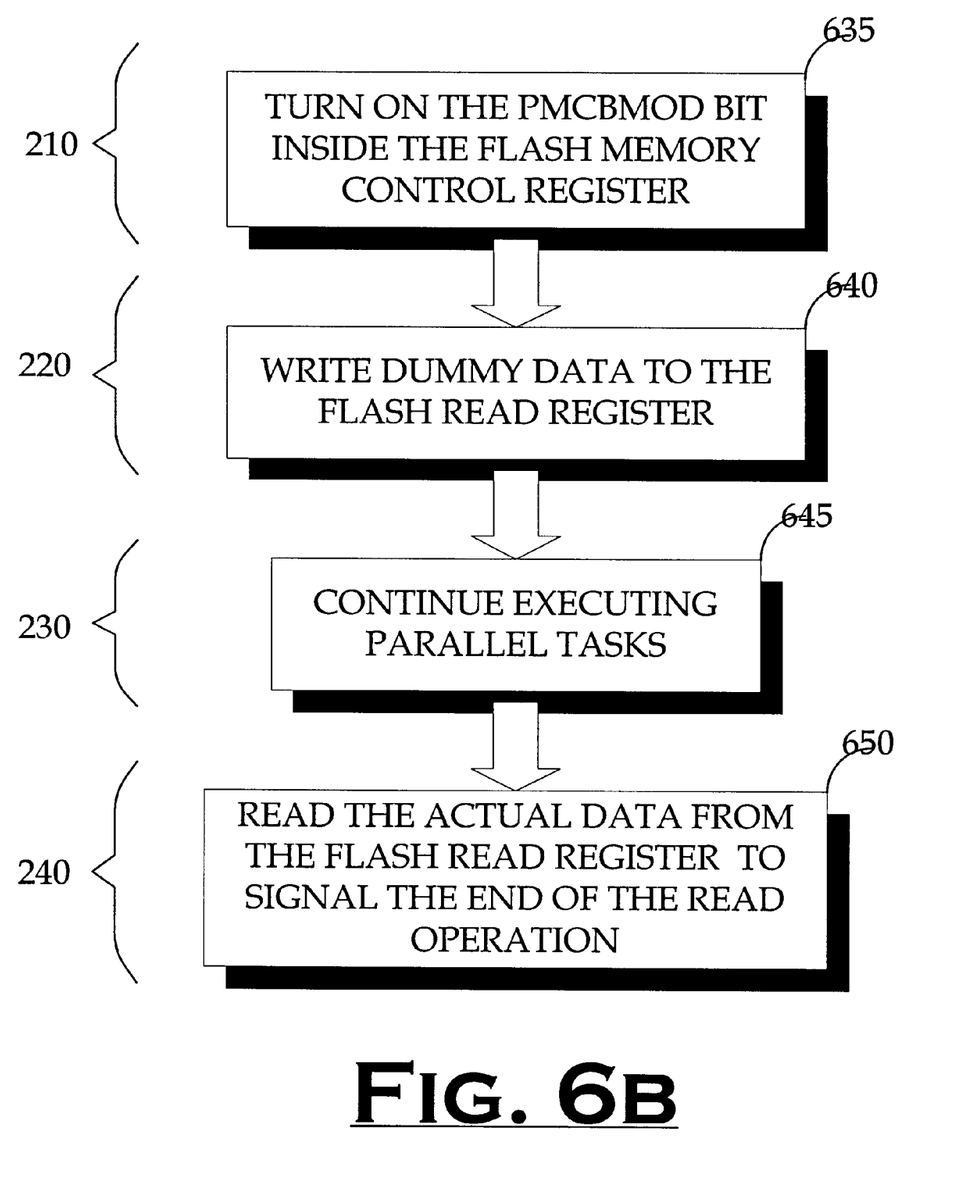

FIGS. 6A and 6B illustrate implementations of the method 200 in FIG. 2 for reads and writes using the apparatus of FIG. 3. Referring now to FIG. 6A, to write data to the peripheral memory 370:

(a) Turn on, i.e., set to "1", the PMCBMOD bit of the flash memory control register 354a, as set forth in the box 605. This switches the memory interface of the processor 340 to the programmable memory based control of the present invention.

(b) Turn on the control signals active in the flash memory control register 354a (e.g., CLE, ALE, etc.) as appropriate, as set forth in the box 610.

(c) Continue processing other, parallel instructions while counting instruction cycles to meet any timing requirements, i.e., set up and hold times for the peripheral memory 370, on the chip selects, or ALE/CLE before a read or write strobe occurs. The number of parallel instructions executed here will determine this period in question.

(d) Write the data/address to the flash write register 354b, as set forth in the box 615, when the timing requirements are met. This data value will come in through the DMDI bus as shown in FIG. 4B. This will put the data/address on the MDBOUT[7-0] data bus as may be seen from FIG. 5. This will also simultaneously pull down the /WE signal. Both the data/address and the /WE signals get latched as may be seen in FIG. 5.

(e) Continue executing parallel instructions for the period required for the write operation to finish, as set forth in the box 620. The count of the instructions that are added at this point will determine the width of the /WE to the flash, the address/data setup time and the duration of the write cycle.

(f) Read the flash write register 354b to pull the /WE signal high (inactive) to signal the end of the write cycle, as set forth in the box 625. The data/address remain latched until the next read/write sequence as can be seen from FIG. 5, which allows for more than required hold time on the MDBOUT data bus. If additional hold time is required, the processor 340 can execute a few instructions here before going for a subsequent read/write cycle.

Turning now to FIG. 6B, to read data from the peripheral memory 370:

(a) Turn on the PMCBMOD bit inside the flash memory control register 354a, as set forth in the box 630.

(b) Write dummy data to the flash read register 354c, as set forth in the box 335, to pull down the /OE signal, which is then latched.

(c) Continue executing parallel tasks as appropriate on the processor 340, as set forth in the box 340. Again, count the instructions, because this period will determine the width of the /OE signal, and thereby the duration of the read cycle. An appropriate delay can be introduced here to allow for the access time ($t_{ac}$) of the slow device, while the processor 340 can continue processing at full rate of the processor clock.

(d) Read the actual data from the flash read register 354c, as set forth in the box 345, which will pull up the /OE signal. This read causes the /OE signal to be pulled high (ie., become inactive), and the data from the flash is latched in from the bidirectional MDB[7-0] bus pads at the rising edge of the /OE signal. This signals the end of the read operation.

Therefore, both the read and write operations are initiated by writing the read/write registers with dummy/real values, and ended by reading the read/write registers, which yields real flash data/unused state of bus, respectively. This protocol keeps it simple for the programmer to write code to work with this hardware. If the programming is done in a higher level language than assembly, say for example in "c", compilers could be optimized to fill in the "delay slots" that the memory access drivers provide with operations that are not waiting for the memory access in question.

Thus, in various implementations of this embodiment, a processor (e.g., microprocessor, digital signal processor, controller, micro-controller) may efficiently read from and write to a peripheral device (e.g., the flash memory of a peripheral). The method employs three dedicated registers: a memory control register, a write register, and a read register. Both read and write operations are initiated by writing the read/write registers with dummy/real values and terminated by reading the read/write registers. The initial write operation alerts the peripheral that an access is about to occur and the final read notifies the peripheral that the access is over. The processor can determine from the initial write how many instruction cycles will be required for the access to be complete and can process other instructions during the wait. When required number of instruction cycles have passed, the processor then performs the access and the terminating read. Since the processor knows how many cycles, it does not have to wait for the access to complete before processing other instructions.

More generally, the invention features many advantages over the state of the art. It allows for a fully software controlled timing generation scheme, wherein the software running on the processor can program the setup time, hold time, and access time given to the slow peripheral. This can be done while simultaneously utilizing its precious instruction cycles for other tasks and without having to wait for the slow peripheral to respond. The processor can continue with intermediate tasks that it needs to complete, and then come back and finish the access that it started at the opportune time when the programmer knows the peripheral would have responded. Other, more particular advantages include:

- a fully programmable memory interface that allows the programmer of the processor to write driver software to control the timing requirements to interface to the slow flash or other memory device—in marked contrast to the object of most system on a chip ("SOC") integrated circuit ("IC") designs.

- the ability to meet the timing requirements of new memories, e.g., new flash memories, by simply modifying the respective software drivers instead of having to actually make silicon mask changes for fabricating them.

- the circumvention of wait-states to accommodate interfacing with slow peripherals. The processor is able to work continually at full clock rate, and thereby save the mips that would have been sacrificed due to the wait-states type of approach.

- all key timing edges are software programmable, so switching from one memory device that needs a different hold time on the data bus and has a different access time is as simple as rewriting the drivers and downloading it into the SOC or re-programming the ROM for it, as the case may be.

- the ability to time multiplex and switch between different peripherals/memories with different timing requirements using one generic programmable interface by simply switching to another preloaded driver that provides proper timing for that device, and selecting the said device by enabling its chip select.

Still other advantages may become apparent to those skilled in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method for accessing a peripheral memory from a processor, the method comprising:
   initiating the access;
   writing information from the processor to an operational register in a processor memory to enable the peripheral memory;
   processing parallel instructions for a predetermined time during which the access occurs; and
   reading the operational register to disable the peripheral memory.

2. The method of claim 1, wherein initiating the access includes invoking a software driver stored in the processor memory.

3. The method of claim 2, wherein invoking the software driver includes setting the contents of a control register in the processor memory to initiate the access.

4. The method of claim 3, wherein the access is a write and initiating the access includes:
   processing parallel instructions until the peripheral memory is enabled; and
   determining when the peripheral memory is enabled from the number of parallel instructions processed.

5. The method of claim 1, wherein the access is a write and initiating the access includes:
   process parallel instructions until the peripheral memory is enabled; and
   determining when the peripheral memory is enabled from the number of parallel instructions processed.

6. The method of claim 1, wherein the access comprises a write operation.

7. The method of claim 6, wherein initiating the access includes:
   processing parallel instructions until the peripheral memory is enabled; and
   determining when the peripheral memory is enabled from the number of parallel instructions processed.

8. The method of claim 6, wherein writing information from the processor to the operational register comprises writing real values to the operational register.

9. The method of claim 6, wherein reading the operational register comprises reading real data.

10. The method of claim 1, wherein the access is a read.

11. The method of claim 10, wherein writing information from the processor to the operational register comprises writing dummy values to the operational register.

12. The method of claim 10, wherein reading the operational register comprises reading dummy data.

13. The method of claim 12, wherein reading the dummy data comprises reading unused bus status data.

14. The method of claim 1, further comprising delaying for a predetermined time after reading the operational register before initiating another access.

15. An apparatus, comprising:
    a peripheral including a peripheral memory;
    a computer interfaced with the peripheral, the computer including:
      a processor electrically coupled to the peripheral memory; and
      a processor memory electrically coupled to the processor, the processor memory further including an operational register; and
      storage for a software implemented peripheral driver that, when invoked by the processor, performs the following acts:
        initiating an access to the peripheral memory;
        writing information from the processor to the operational register to enable the peripheral memory;
        processing parallel instructions for a predetermined time during which the access occurs; and
        reading the operational register to disable the peripheral memory.

16. The apparatus of claim 15, the peripheral memory is a flash memory.

17. The apparatus of claim 15, wherein the computer comprises a system on a chip.

18. The apparatus of claim 15, wherein the processor comprises one of a microprocessor, a digital signal processor, and a micro-controller.

19. The apparatus of claim 18, wherein the processor comprises an embedded digital signal processor.

20. The apparatus of claim 15, wherein the operational register is one of a write register and a read register.

21. The apparatus of claim 15, wherein the processor memory further inlcudes a control register that may be set to control the access.

22. The apparatus of claim 15, wherein the storage comprises at least one of a random access memory and a read-only memory.

23. A program storage medium encoded with instructions that, when executed by a processor, perform a method comprising:
    initiating an access to a peripheral memory;
    writing information from a processor to an operational register in a processor memory to enable the peripheral memory;
    processing parallel instructions for a predetermined time during which the access occurs; and
    reading the operational register to disable the peripheral memory.

24. The program storage medium of claim 23, wherein initiating the access in the encoded method includes setting the contents of a control register in the processor memory to initiate the access.

25. The program storage medium of claim 24, wherein the access is a write and initiating the access in the encoded method includes:
    processing parallel instructions until the peripheral memory is enabled; and
    determining when the peripheral memory is enabled from the number of parallel instructions processed.

26. The program storage medium of claim 23, wherein the access is a write and initiating the access in the encoded method includes:
    processing parallel instructions until the peripheral memory is enabled; and
    determining when the peripheral memory is enabled from the number of parallel instructions processed.

27. The program storage medium of claim 23, wherein the access comprises a write operation.

28. The program storage medium of claim 27, wherein initiating the access in the encoded method includes:
    processing parallel instructions until the peripheral memory is enabled; and
    determining when the peripheral memory is enabled from the number of parallel instructions processed.

29. The program storage medium of claim 27, wherein writing information from the processor to the operational register in the encoded method comprises writing real values to the operational register.

30. The program storage medium of claim 27, wherein reading the operational register in the encoded method comprises reading real data.

31. The program storage medium of claim 23, wherein the access is a read.

32. The program storage medium of claim 31, wherein writing information from the processor to the operational register in the encoded method comprises writing dummy values to the operational register.

33. The program storage medium of claim 31, wherein reading the operational register in the encoded method comprises reading dummy data.

34. The program storage medium of claim 33, wherein reading the dummy data in the encoded method comprises reading unused bus status data.

35. The program storage medium of claim 23, wherein the encoded method further comprises delaying for a predetermined time after reading the operational register before initiating another access.

* * * * *